US006968596B2

(12) United States Patent
Oh et al.

(10) Patent No.: US 6,968,596 B2
(45) Date of Patent: Nov. 29, 2005

(54) CYCLONE-TYPE DUST-COLLECTING APPARATUS FOR VACUUM CLEANER

(75) Inventors: Jang-keun Oh, Gwangju (KR); Hyun-ju Lee, Jeonju (KR); Hyoung-jong Jin, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 417 days.

(21) Appl. No.: 10/277,546

(22) Filed: Oct. 22, 2002

(65) Prior Publication Data

US 2003/0213091 A1 Nov. 20, 2003

(30) Foreign Application Priority Data

May 16, 2002 (KR) ................. 2002-27043

(51) Int. Cl.[7] .................. A47L 9/16; B01D 45/12; B01B 45/16
(52) U.S. Cl. ............ 15/353; 55/337; 55/426; 55/459.1; 55/505; 55/507; 55/DIG. 3
(58) Field of Search .................. 15/327.1, 327.2, 15/327.6, 327.7, 350–353; 55/337, 426, 459.1, 55/505, 507, DIG. 3

(56) References Cited

U.S. PATENT DOCUMENTS

| 3,386,230 A | * | 6/1968 | Riesberg et al. ............ 55/337 |
| 3,636,681 A | | 1/1972 | Batson et al. |
| 4,699,641 A | | 10/1987 | Barnes, Jr. |
| 6,195,835 B1 | | 3/2001 | Song et al. |
| 6,425,931 B1 | * | 7/2002 | Croggon ..................... 55/414 |
| 6,428,589 B1 | * | 8/2002 | Bair et al. .................... 55/318 |
| 6,502,278 B2 | | 1/2003 | Oh et al. |
| 6,524,358 B2 | * | 2/2003 | Yang ........................... 55/337 |
| 6,648,934 B2 | * | 11/2003 | Choi et al. .................. 55/337 |
| 2001/0025395 A1 | | 10/2001 | Matsumoto et al. |
| 2001/0039692 A1 | * | 11/2001 | Wright et al. ................ 15/353 |
| 2001/0054213 A1 | * | 12/2001 | Oh et al. ..................... 15/353 |
| 2003/0159239 A1 | | 8/2003 | Oh |
| 2003/0221280 A1 | * | 12/2003 | Oh et al. ..................... 15/353 |

FOREIGN PATENT DOCUMENTS

| DE | 10124216 | | 1/2002 |
| EP | 1136028 | | 9/2001 |
| GB | 2381223 | | 4/2003 |
| JP | 11146850 | | 6/1999 |
| JP | 2000 166829 | | 6/2000 |
| JP | 2002 051949 | | 2/2002 |
| JP | 2002-136459 | * | 5/2002 |
| JP | 2002 235003 | | 8/2002 |
| WO | WO 0228260 | | 4/2002 |

* cited by examiner

Primary Examiner—Terrence R. Till
(74) Attorney, Agent, or Firm—Ladas & Parry LLP

(57) ABSTRACT

A cyclone-type dust-collecting apparatus for a vacuum cleaner comprises a conically shaped grill assembly disposed at the air outflow port of a cyclone body. The grill assembly includes a grill portion and prevents reverse flow of dust and dirt from the cyclone body. The grill assembly members are easily separable to allow a user to easily remove the dirt collected in the grill portion by simply separating the second grill member from the connection member and washing the second grill member with water.

14 Claims, 8 Drawing Sheets

CYCLONE-TYPE DUST-COLLECTING APPARATUS FOR VACUUM CLEANER

BACKGROUND OF THE INVENTION

1. Field of the Invention

This application relates generally to a vacuum cleaner and, more particularly, to a cyclone-type dust-collecting apparatus for a vacuum cleaner that generates an air vortex of dust-laden air drawn into the cyclone-type dust-collecting apparatus and utilizes the centrifugal force of the air vortex to separate the dust and dirt in the dust-laden air.

2. Description of the Prior Art

FIGS. 1–3 schematically illustrate the structure of a conventional cyclone-type dust-collecting apparatus for a vacuum cleaner as disclosed in U.S. Pat. No. 6,195,835 (assigned to the same assignee as the present application).

Now referring to FIG. 1, the conventional cyclone-type dust-collecting apparatus for a vacuum cleaner is generally made up of a cyclone body 20, a dust-collecting receptacle 30, and a grill assembly 40.

The cyclone body 20 is divided into an upper body 21 and a lower body 22 that are secured by a plurality of screws 23. The opening of a first connection pipe 24 of the lower body 22 is connected to one end of an extension pipe 1a. The other end of the extension pipe 1a is connected to a suction port (not shown) of the vacuum cleaner. The dust-laden air flows into the suction port (not shown) of the vacuum cleaner, flows through the extension pipe 1a and the first connection pipe 24, and enters into an air inflow port 25 of the lower body 22. The air then travels through the dust-collecting receptacle 30 and the grill assembly 40, flows into the upper body 21 of the conventional cyclone-type dust-collecting apparatus 10. The air from the dust-collecting receptacle 30 and the grill assembly 40 flows through an air outflow port 27 encased by a second connection pipe 26 of the upper body 21. The opening of the second connection pipe 26 is connected to one end of the extension pipe 1b, and the other end of the extension pipe 1b is connected to a cleaner body (not shown) of the vacuum cleaner. The air flowing out of the upper body 21 then ends up in the cleaner body (not shown) of the vacuum cleaner.

The first connection pipe 24 (and thus the air inflow port 25) of the cyclone body 20 is shaped in such a way so that the dust-laden air flows into the air inflow port 25 at an oblique angle or direction with reference to the direction of the first connection pipe 24 and the air inflow port 25, accordingly, to start and maintain the air vortex (shown by the arrows in FIG. 1) in the cyclone body 20 and also in the dust-collecting receptacle 30. The centrifugal force generated by the air vortex is then utilized to separate the dirt and dust in the dust-laden air. The dust-collecting receptacle 30 is removably connected to the cyclone body 20.

Now referring to FIG. 2, the grill assembly 40 includes a grill body 41 and an air backflow prevention plate 43. The grill assembly 40 is disposed at the air outflow port 27 of the cyclone body 20 (FIG. 1), for preventing the dust in the dust-collecting receptacle 30 from flowing back into the air outflow port 27. The grill body 41 of the grill assembly 40 is generally shaped as an elongated cylindrical tube that has a plurality of fine passage holes 42 throughout the outer circumferential surface of the cylindrically shaped grill body 41. The opening at one end of the grill body 41 is connected to the air outflow port 27 of the cyclone body 20. Generally, the opening of the grill body 41 includes at one end a circumferential edge 41a that is shaped to mate with the upper body 21 of the cyclone body 20. The other end of the grill body 41 is connected to the air backflow prevention plate 43, which is disposed at the other, lower end of the grill body 41. The air backflow prevention plate 43 preferably has a frusto-conical shape.

As described above, the air vortex is created in the dust-collecting receptacle 30 (solid-line arrows in FIG. 1). In the conventional cyclone-type dust collecting apparatus for the vacuum cleaner as described above, dust-laden air is drawn in by a suction force generated at a suction port of the cleaner, and into the cyclone body 20 in the oblique direction via the first connection pipe 24 and the air inflow port 25. Then, the air descends into the dust collecting receptacle 30, forming the air vortex (Solid-lined arrows in FIG. 1). During this process, the dust and dirt are separated from the air by the centrifugal force and collected in the dust collecting receptacle 30.

The dust-laden air in the dust-collecting receptacle 30, which is shown by air currents ascending upwardly from the bottom of the dirt-collecting receptacle 30 (shown as dotted-line arrows in FIG. 1), flows sequentially through the fine passage holes 42 of the grill assembly 40, the air outflow port 27, the second connection pipe 26 toward the cleaner body (not shown) of the vacuum cleaner. Some of the dust in the ascending air currents (dotted-line arrows in FIG. 1) in the dust-collecting receptacle 30 is blocked by the air backflow prevention plate 43 and is returned to the air vortex (solid line arrows in FIG. 1). The dust not blocked by the air backflow prevention plate 43 still remains in the ascending air currents after the air backflow prevention plate 43 returns the dust to the air current flow while the air is passed through the fine passage holes 42 of the grill assembly 40. Dust having a size larger than the size of the fine passage holes 42 is filtered by the fine passage holes 42 and is thereby returned to the air vortex. The dust that is not separated from the air vortex is discharged toward the air outflow port 27 through the fine passage holes 42 of the grill assembly 40, and is then filtered out by a paper filter (not shown) in the cleaner body (not shown) of the vacuum cleaner. The clean air is eventually discharged from the vacuum cleaner by a motor.

The conventional cyclone-type dust-collecting apparatus for a vacuum cleaner as described above, however, is difficult to maintain, mainly due to the difficulty associated with the removal of the dust gathered in and around the fine passage holes 42 of the grill assembly 40. During the discharging process, as the air is passed through the fine passage holes 42 of the grill assembly 40, the dust and dirt entrained the air is gathered in the fine passage holes 42, and clogs the openings. When the fine passage holes 42 are clogged with the dirt and dust, deterioration of the suction force may overload the motor of the vacuum cleaner. The overall cleaning efficiency of the vacuum cleaner is thereby lowered.

A user of the conventional type vacuum cleaner therefore is required to periodically remove the dust and dirt accumulated in and around the fine passage holes 42 of the grill assembly 40. However, removing the accumulated dust and dirt may not be an easy task to a user due to the way the grill assembly 40 is connected to the cyclone body 20 in a conventional cyclone-type dust-collecting apparatus. Therefore, it would be desirable to achieve a better dust and dirt removal feature that allows a user to more easily remove the dust and dirt accumulated on the grill assembly 40. In order to remove the dust and dirt from the grill assembly 40 in the conventional cyclone-type dust-collecting apparatus, the user must separate the cyclone-type dust-collecting apparatus from the extension pipe of the cleaner and directly remove the dust and dirt with a brush or his/her hand. Therefore, inevitably a sanitary problem results.

Further, the cleaning efficiency is positively influenced by more stable air vortex created in the cyclone body 20. The stability of the air vortex in the cyclone body 20 is affected by the air currents moving in different directions. For example, as shown in FIG. 3, the air vortex created in the cyclone body 20 of the conventional cyclone-type dust-collecting apparatus generally contains three air currents A, B, and C, each moving in a different direction. As the air is drawn in through the air inflow port 25, the air currents B and C mix with the air current A swirling along an inner circumference 22a of the lower body 22 of the cyclone body 20. The direction of the air currents B and C is not aligned with the direction of the air current A. For example, the air current C joins with the air current A at an angle θ as shown in FIG. 3. Therefore, a more stable air vortex and the cleaning efficiency can be achieved by controlling the flow directions of these air currents.

SUMMARY OF THE INVENTION

Against this background, embodiments of the present invention have been developed in order to solve the above and other problems of the prior art.

It is an object of the present invention to provide a cyclone-type dust-collecting apparatus having a structure that enables a user to more easily maintain and care for the vacuum cleaner, in particular by providing a grill assembly that can easily be separated from the rest of the structure for removal of the collected dust and dirt, for example, by washing. It is another object of the present invention to provide a cyclone-type dust-collecting apparatus for a vacuum cleaner that, improves the stability and the directionality of the air vortex formed in a cyclone body of the apparatus of and thereby improving the overall cleaning efficiency of the vacuum cleaner.

To achieve these objectives and others, a cyclone-type dust-collecting apparatus for a vacuum cleaner according to the present invention comprises a cyclone body, a dust-collecting receptacle, and a grill assembly. The cyclone body comprises an air inflow port and an air outflow port, the air inflow port directing air current at an oblique angle to the wall of the receptacle thereby forming an air vortex of dust-laden air drawn thereinto through the air inflow port. The dust-collecting receptacle is removably connected to the cyclone body for separating the dust and dirt from the air vortex of the dust-laden air and collecting the separated dust and dirt therein. The grill assembly is disposed at the air outflow port of the cyclone body for preventing the reverse flow of the dust and dirt into the air outflow port of the cyclone body. The grill assembly comprises a first grill member, a second grill member, and a connection member. The first grill member has a supporter supported on the air outflow port of the cyclone body and the second grill member has a grill portion that comprises a plurality of fine radially extending passage holes to provide fluid communication and serve as an air flow path to the air outflow port; and the connection member allows the first grill member and the second grill member to be separably connected to each other.

Since the second grill member is separably connected to the first grill member by the connection member, a user can easily remove the dirt, which has collected in the grill portion of the second grill member by simply separating the second grill member from the connection member and washing the second grill member with water or other suitable cleaning agents.

The first grill member and the second grill member have a first connection groove and a second connection groove, respectively, each formed in the outer circumferential surfaces of connection ends the first and second grill members. The connection member has a first connection protrusion and a second connection protrusion formed in a circular shape along an inner circumference of the connection member and being configured and adapted to accommodate the first connection and second connection groove profiles for providing easy connection to the first and second connection grooves.

The connection member is made of a flexible material, such as rubber, and the second connection groove and the second connection protrusion are shaped having a hemispherical such that the second grill member is easily connected to, or separated from, the connection member.

The connection member has a first tapered portion formed on an outer surface thereof, the diameter of the first tapered portion gradually increasing in a direction away from the first connection protrusion, the first tapered portion providing for prevention of reverse-flow of the dirt into the outflow port, and the connection member has a second tapered portion formed on an inner diverging surface of the connection member, the diameter of the second tapered portion gradually increasing in a direction away from the second connection protrusion, the second tapered portion providing for guiding the connection of the second grill member to the connection member.

The second grill member is divided into an open part and a closed part formed at an upper side and a lower side thereof, respectively, the open part having a plurality of radially extending passage holes opened with respect to a radial direction, the closed part closed with respect to the radial direction, and to the open part is attached a net such that the second grill member is provided with a grill portion. In addition, the grill assembly further comprises an air backflow prevention member disposed at a lower side of the second grill member for blocking the dust in the air current ascending from the bottom of the dust-collecting receptacle.

The air backflow prevention member includes, inter alia, a cylinder body, a shaft, and a plate. The cylinder body has upper and lower supporters, each of which is comprised of at least two ribs. The cylinder body is inserted into the lower side of the second grill member and connected thereto by interference fit. The shaft is supported by the upper and lower supporters. The plate is connected to an end of the shaft and distanced from a lower end of the second grill member. The cylinder body has a spiral guide formed therein for guiding a movement of the air. The cylinder body and the plate are made of rubber, and the plate is conically shaped.

The cyclone body also has a guide member disposed at a sidewall of the air inflow port of the cyclone body and has a guide surface of a predetermined curvature for guiding movement of the air drawn into the air inflow port to increase stableness and directionality of the air vortex. Accordingly, the cleaning efficiency is improved and reverse flow of the dirt is prevented due to increased stability and directionality of the air vortex. The radius of curvature of the guide surface is smaller than the radius of a portion in the cyclone body in which the air vortex is maintained.

These and various other features as well as advantages which characterize the present invention will be apparent from a reading of the following detailed description and a review of the associated drawings.

DETAILED DESCRIPTION OF THE PREFERRED EMBODIMENT

Figure 1:
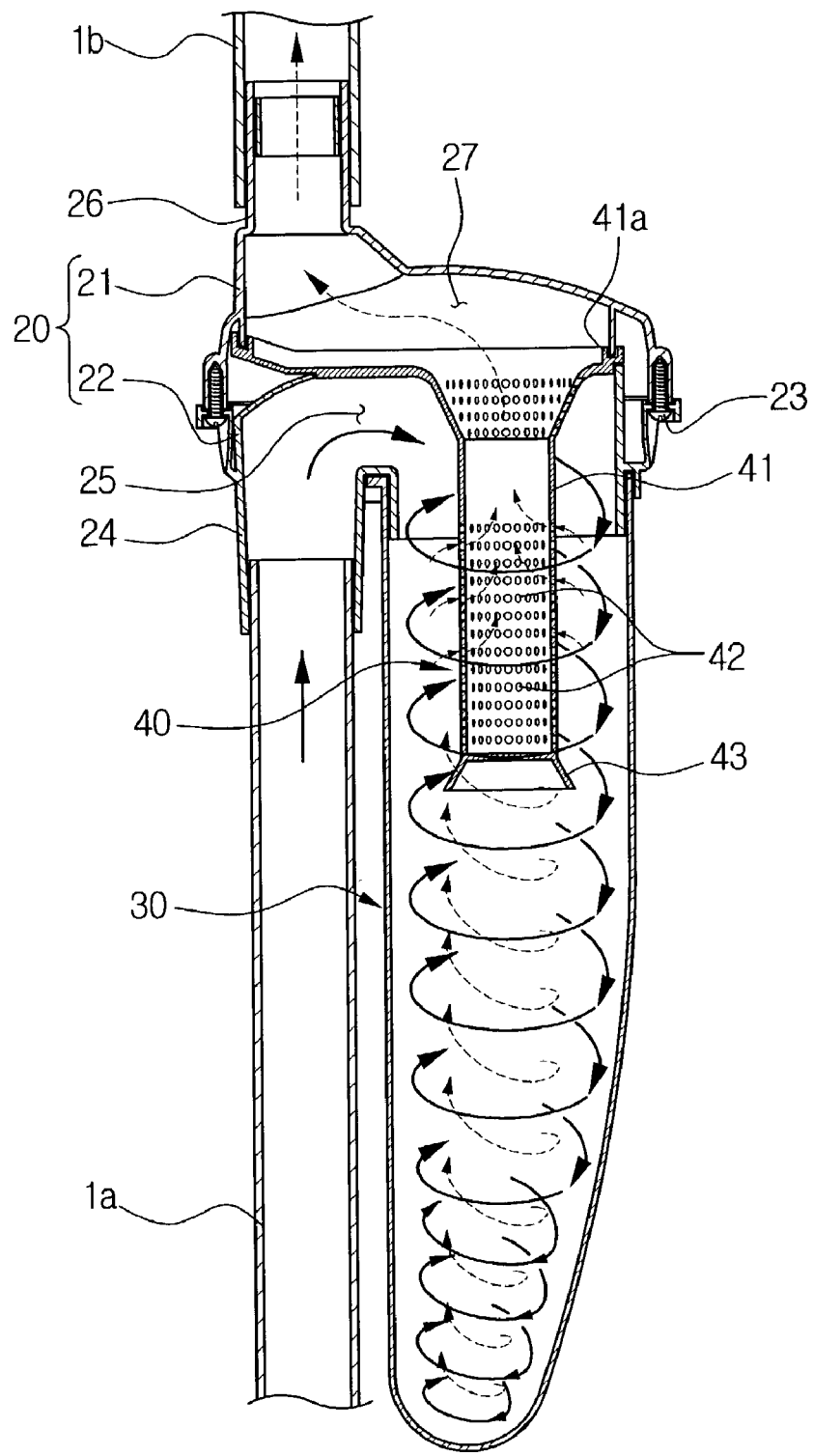
FIG. 1 is a cross-sectional view of a conventional cyclone-type dust-collecting apparatus for a vacuum cleaner.
Figure 2:
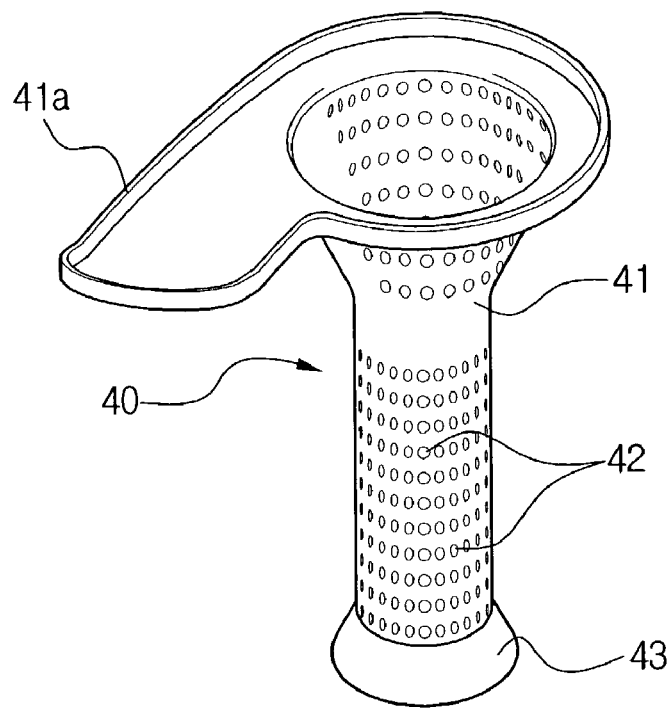
FIG. 2 is a perspective view of a grill assembly utilized in a conventional cyclone-type dust-collecting apparatus as shown in FIG. 1.

Now referring to FIGS. 4–9, a cyclone-type dust-collecting apparatus for a vacuum cleaner according to an embodiment of the present invention comprises a cyclone body 20, a dust-collecting receptacle 30, and a grill assembly 400.

The cyclone body 20 includes an upper body 21 and a lower body 22 that are fastened together by a plurality of screws 23. The lower body 22 is provided with a first connection pipe 24 connected to an extension pipe 1a extending toward a suction port of a cleaner (not shown) and an air inflow port 25 being in fluid communication with the first connection pipe 24. The upper body 21 includes a second connection pipe 26 connected to one end of a second extension pipe 1b, and the other end of the extension pipe 1b is connected to a body (not shown) of the vacuum cleaner. The second connection pipe 26 is also connected to an air outflow port 27 (FIG. 9) in fluid communication with the second connection pipe 26. On the sidewall 22b (FIG. 5) of the air inflow port 25, a guide member 28 is formed to provide an arcuate guide surface 28a having a predetermined a radius of curvature R2. Preferably, the radius of curvature R2 is smaller than the radius of curvature R1 (FIG. 5) of an inner circumference 22a of the lower body 22 in which an air vortex is maintained.

Dust-laden air is drawn into the suction port (not shown) of the vacuum cleaner, into the cyclone body 20 in a tangential direction through the first connection pipe 24, and through the air inflow port 25. Accordingly, an air vortex is created in the cyclone body 20 and in the dust-collecting receptacle 30. The centrifugal force generated by the air vortex is then utilized to separate and collect the dust and dirt in the dust-laden air by centrifugal force.

Figure 5:
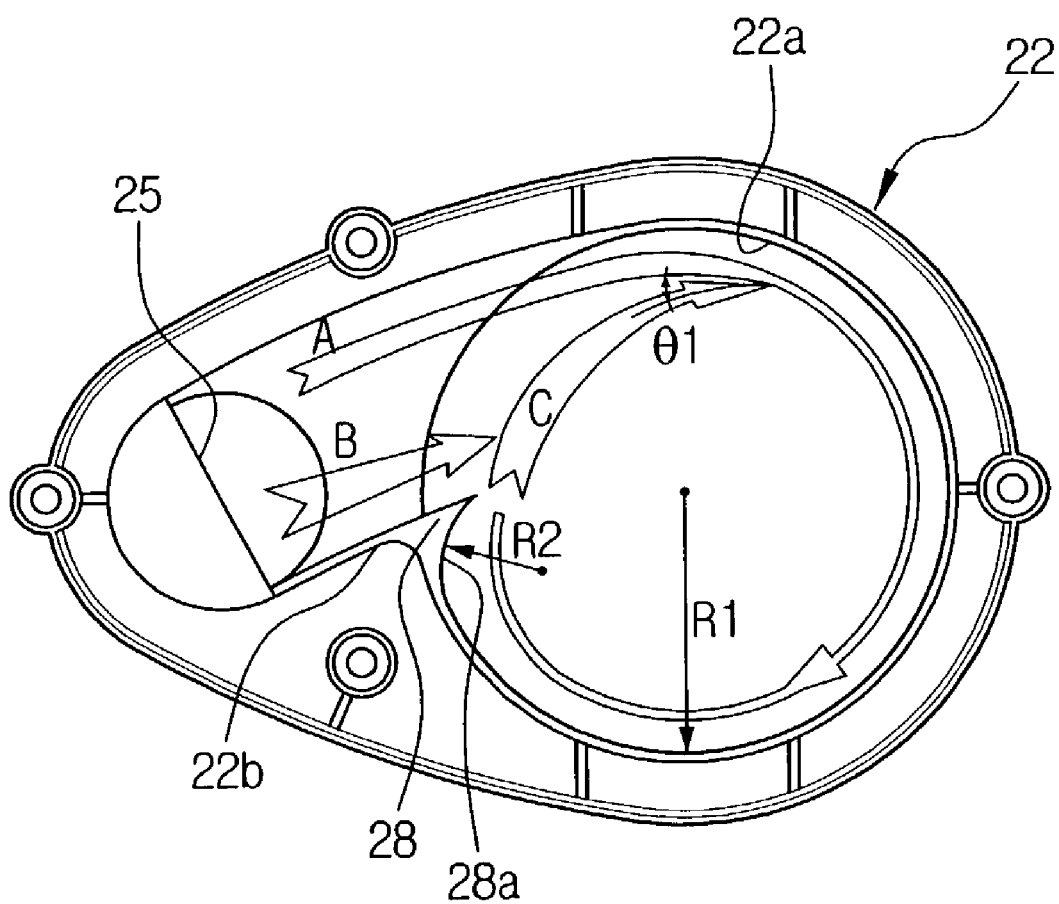
FIG. 5 is a plan view of a lower cyclone body of an air vortex in a cyclone-type dust-collecting apparatus of FIG. 4 according to an embodiment of the present invention showing the directions of air flow of dust-laden air currents.

FIG. 5 shows flow directions of the air currents A, B, and C that are drawn into the air inflow port 25 and which merge together to form an air vortex in the cyclone body 20 and the dust-collecting receptacle 30. The air current C is guided by the guide surface 28a of the guide member 28 so that the air moves along the inner circumference 22a of the lower body 22 to join the air current A at a small joining angle θ1. That is, the guide member 28, particularly the guide surface 28a, is designed to achieve the appropriately small joining angle θ1 that would prevent the air current C from substantially disturbing or obstructing the advancing flow of the air current A. That is, the optimal value of the small joining angle θ1 is an angle that would produce the least disturbance and obstruction as the air currents C and A (and other currents) merge and that would thereby create a stable air vortex in the cyclone body 20 and the dust-collecting receptacle 30. The air current B is also guided by the guide member 28 and moves in the direction of a joining angle with the air current A producing minimal disturbance to the advancing flow of the air current A.

Figure 3:
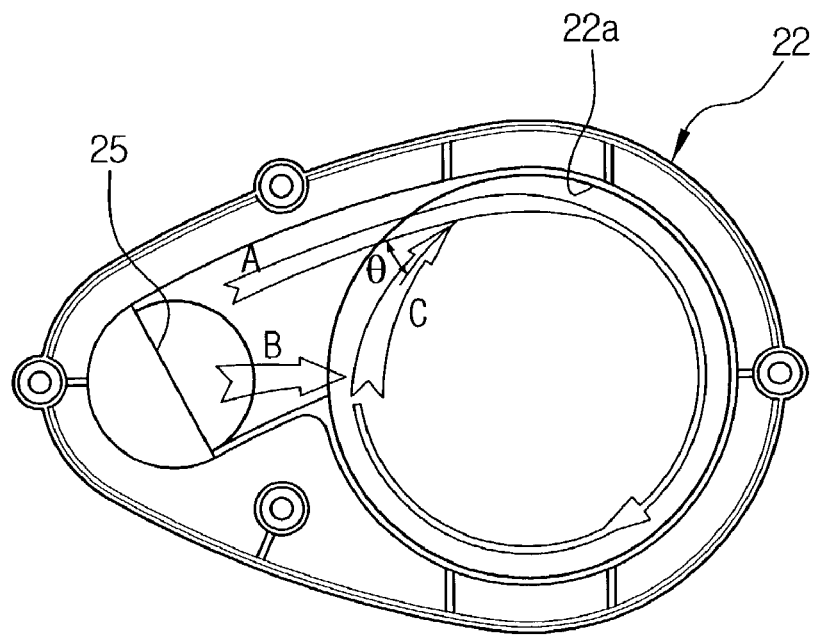
FIG. 3 is a plan view of the conventional lower cyclone body showing directions of air flow of dust-laden air to create an air vortex in a conventional cyclone-type dust-collecting apparatus, shown in FIG. 1.
Figure 4:
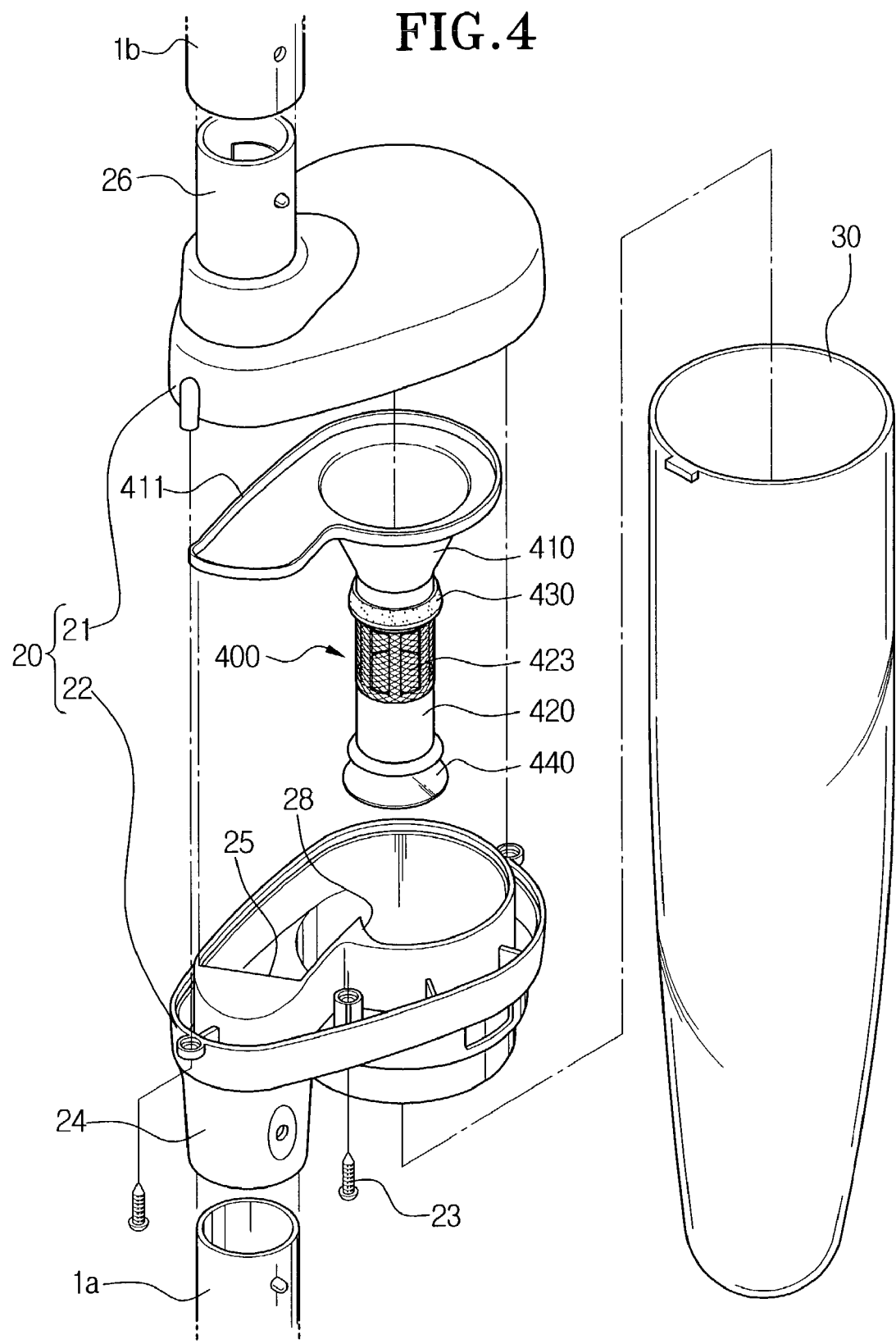
FIG. 4 is an exploded perspective view of a cyclone-type dust-collecting apparatus for a vacuum cleaner according to an embodiment of the present invention.

The joining angle θ of the prior art, as shown in FIG. 3, is larger than the small joining angle θ1 as shown in FIG. 5 of the present invention. Thus, in the prior art system having a larger joining angle, such as θ, the air currents B and C would flow in obstructive directions against the advancing flow direction of the air current A, thereby coming into conflict with the air current A. According to the present invention, however, the air currents B and C are guided by the guide member 28 to thereby move in the direction of the air current A while adding minimal obstruction or disturbance to the air vortex created in the cyclone body 20 and the dust-collecting receptacle 30. Therefore, the air vortex created is more stable than that produced by the prior art and the desired directionality of the air vortex is improved. Accordingly, reverse flow of the dust is prevented and cleaning efficiency is improved.

Now referring back to FIG. 4, the dust-collecting receptacle 30 is removably connected to the cyclone body 20, to permit the forming of the air vortex by the drawn-in air in cooperation with the cyclone body 20, and the dust and dirt are separated from the air by the air vortex and are collected therein.

The grill assembly 400 is disposed adjacent and is connected to the air outflow port 27 of the cyclone body 20. The grill assembly 400 inhibits the reverse flow of the dust collected in the dust-collecting receptacle 30 into the air outflow port 27.

Figure 6:
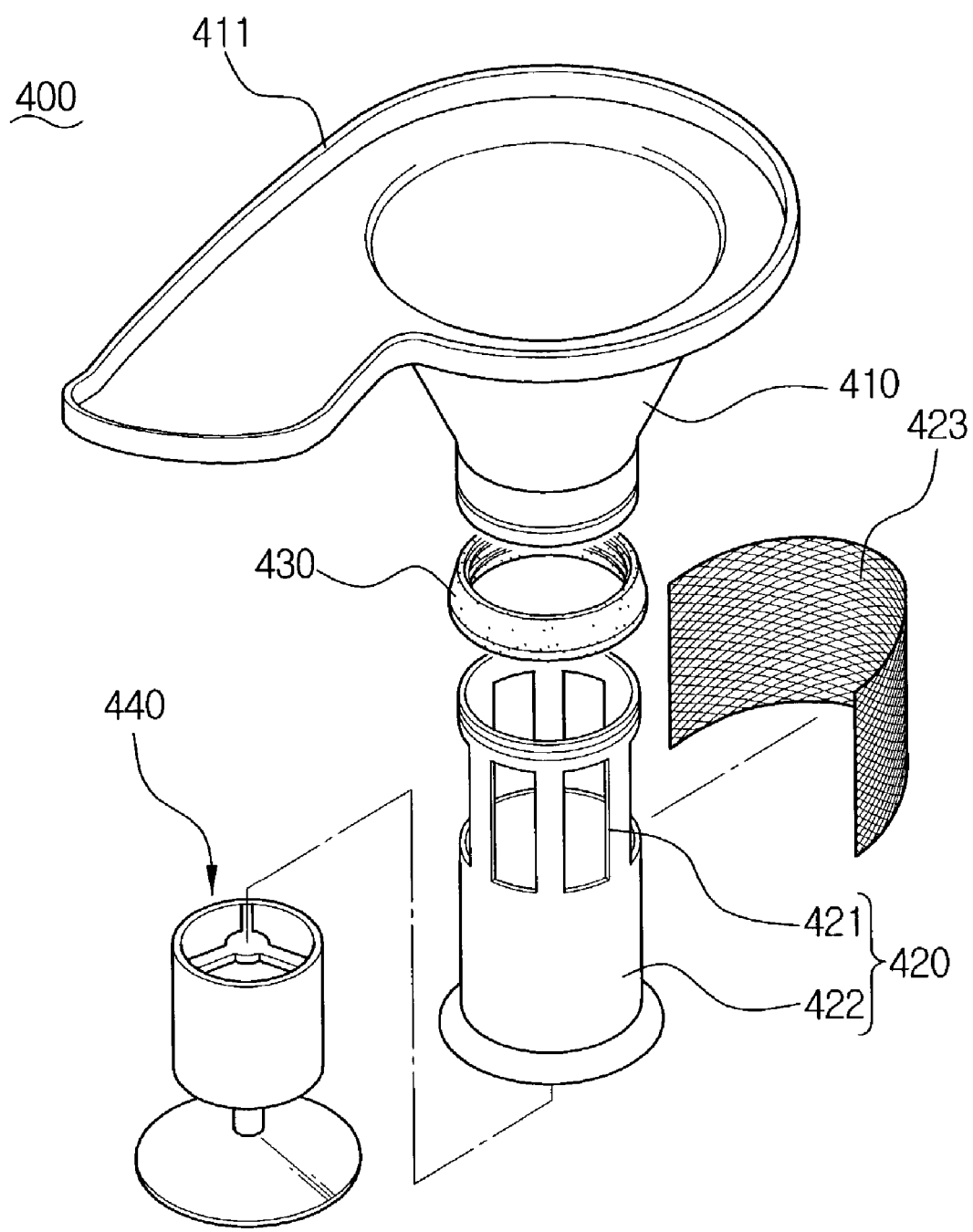
FIG. 6 is an exploded perspective view of a grill assembly of a cyclone-type dust-collecting apparatus of FIG. 4 according to an embodiment of the present invention.

Now referring to FIG. 6, the grill assembly 400 according to an embodiment of the present invention comprises a first grill member 410 and a second grill member 420 that are separably connected by a connection member 430.

The first grill member 410 is a conically-shaped shell that has a larger round opening at one end and a smaller round opening at the other end. Along the perimeter of the larger opening of the first grill member 410 is a supporter 411 that is supported on the air outflow port 27 of the cyclone body 20 and is supported by the upper body 21 and the lower body 22 of the cyclone body 20.

The second grill member 420 is shaped approximately in the shape of a cylinder. As shown in FIG. 6, the upper portion of the second grill member 420 is an open part 421 having a plurality of passage openings on its cylindrical surface. The lower portion of the second grill member 420 is a closed part 422, which has no openings on its cylindrical surface. A net or other flexible material with fine passage holes is then used to wrap around the open part 421 to cover the passage openings.

A grill portion 423 having a plurality of fine passage holes for serving as a path to the air outflow port 27 is then formed in the second grill member 420. Although a net is used to construct the grill portion 423 in this embodiment, it would be obvious to those skilled in the art that other suitable materials can be used to obtain substantially same or similar results. For example, the grill portion 423 can be formed by punching of a plurality of holes in a portion of the second grill member 420 or by disposing a plurality of blades on the open part 421.

The connection member 430 is formed in the shape of an annular member, having a predetermined height and designed to fit with the first grill member 410 and the second grill member 420. Although various materials may be utilized, the connection member 430 is preferably made of a flexible material, such as a rubber material.

Figure 7:
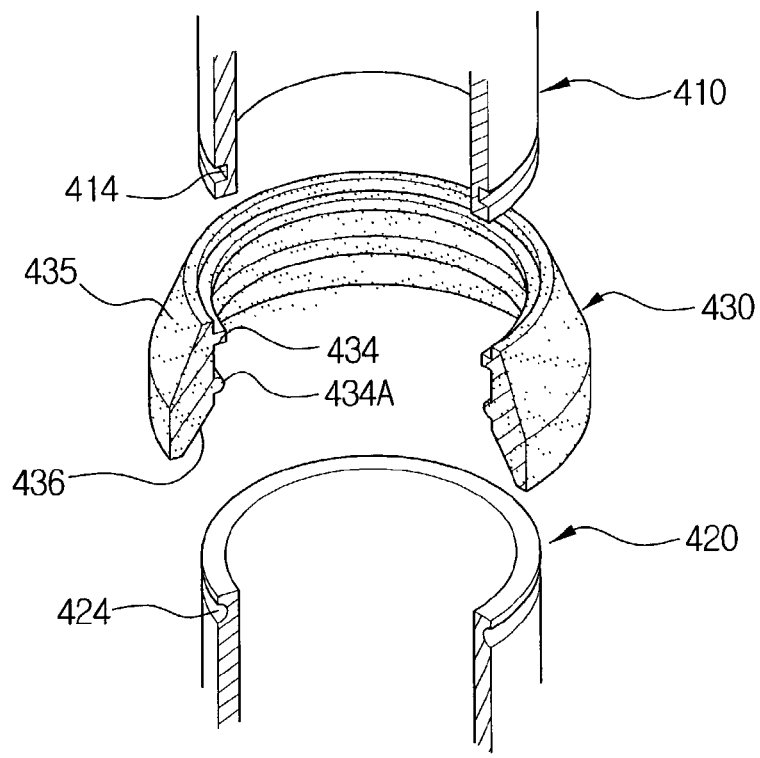
FIG. 7 is an exploded perspective view of a connection structure of a first grill member and a second grill member of a grill assembly according to the embodiment of the present invention shown in FIG. 6.

As shown in FIG. 7, the first and second grill members 410, 420, respectively, have first and second connection grooves 414, 424, respectively, formed along the outer circumferential surfaces of the respective ends of the first and second grill members 410, 420. The connection member 430 has a first connection protrusion 434 at one end and a second connection protrusion 434A at the other end along an inner circumferential surface of the connection member 430. The shape of each of the first connection end 410 and the connection member 430 is shaped and configured so that the first connection protrusion 434 fits in the first connection groove 414. Likewise, the shape of each of the second connection end 420 and the connection member 430 is also shaped and configured so that the second connection protrusion 434A fits in the second connection groove 424.

Generally, the second connection groove 424 and the second connection protrusion 434A have a round profile in cross-section, as shown, and the first connection groove 414 and the first connection protrusion 434 have a square shape in cross-sectional profile. As a result of the profile shape, connecting and disconnecting the connection member 430 from the second grill member 420 is easier than connecting and disconnecting the connection member 430 from the first grill member 410. This is very advantageous to a user, since the second grill member 420 is frequently required to be connected to or separated from the connection member 430, for various reasons, such as cleaning the grill assembly 400.

The connection member 430 has a first tapered portion 435 formed on the outer surface of the connection member 430. The diameter of the upper end of the first tapered portion 435 gradually increases so that the diameter of the lower end is greater than the diameter of the upper end. This design of the first tapered portion 435 also serves as an air reverse flow prevention member. The connection member 430 has a second tapered portion 436 formed on an inner and lower side of the connection member 430. The diameter of the lower end of the second tapered portion 436 gradually increases and diverges as measured away from the upper end so that the diameter of the lower end is greater than the diameter of the upper end, which configuration permits for guiding the connection of the second grill member 420 to easily connect with the connection member 430.

Figure 8:
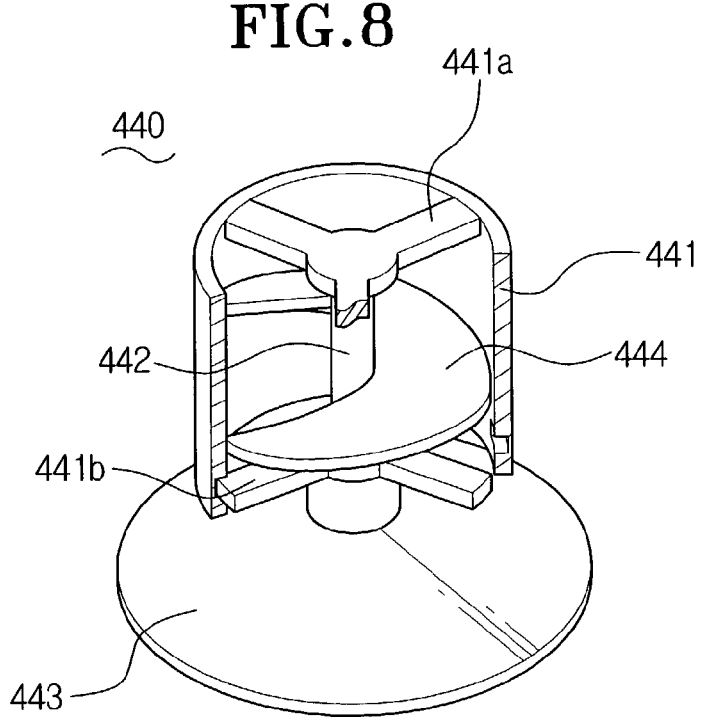
FIG. 8 is a perspective view of an air backflow (reverse flow) prevention member of a cyclone-type dust-collecting apparatus according to an embodiment of the present invention.

Now referring to FIG. 8, the grill assembly 400 further comprises an air reverse flow prevention member 440 that is mounted at the lower side of the second grill member 420. The air reverse flow prevention member 440 prevents the dust and dirt entrained in the vortex of the air current from ascending within the dust-collecting receptacle 30. The second grill member 420 has an opening formed at the lower side thereof, through which the air reverse flow prevention member 440 is mounted in the second grill member 420. As shown in FIG. 8, the air reverse flow prevention member 440 comprises a cylinder body 441, a shaft 442, and a plate 443.

Referring again to FIGS. 6 and 8, the cylinder body 441 of the air reverse flow prevention member 440 is inserted by interference fit into the closed part 422 of the second grill member 420. The cylinder body 441 has upper and lower supporters 441a, 441b, respectively, formed on upper and lower portions thereon. Each of the supporters 441a, 441b has a plurality of at least two ribs, and preferably three ribs, although the number of ribs is not limited. The shaft 442 is mounted on and supported by the upper and lower supporters 441a, 441b. One end of the shaft 442 is connected to the plate 443.

Figure 9:
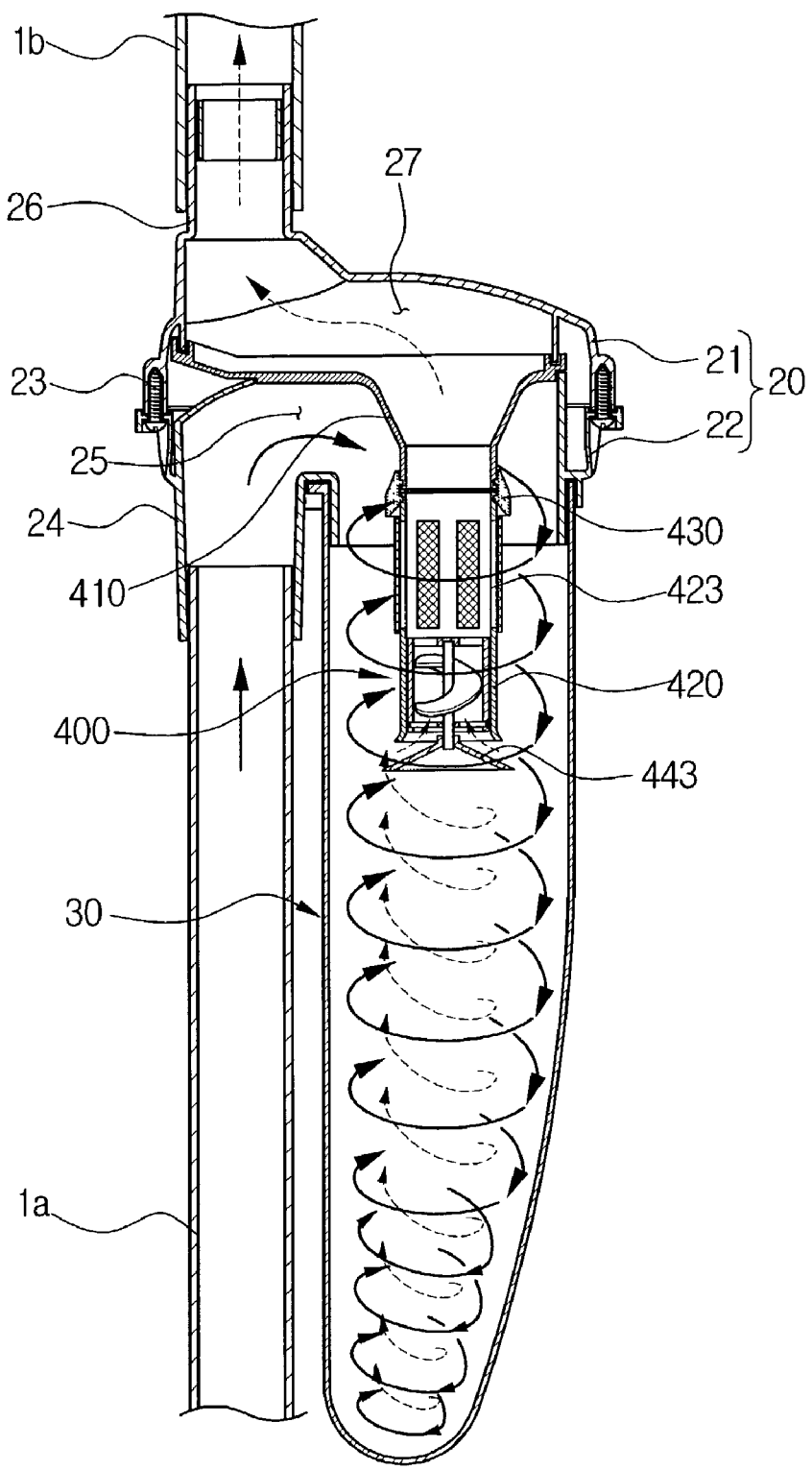
FIG. 9 is a cross-sectional view of a cyclone-type dust-collecting apparatus for a vacuum cleaner according to the embodiment of the present invention.

Now referring to FIG. 9 (as well as FIGS. 6 and 8), the plate 443 does not block fluid access to the lower end of the second grill member 420. A gap exists between the plate 443 and the lower end 422 of the second grill member 420 such that the air current ascending from the bottom of the dust-collecting receptacle 30 flows into the second grill member 420 through the gap between the lower end of the second grill member 420 and the plate 443, as is shown by dotted line arrows in FIG. 9. The air current entering into the cylinder body 441 is guided by a spiral guide 444 (FIG. 8) mounted within the cylinder body 441. Preferably, the cylinder body 441 and the plate 443 are made from a flexible material, such as rubber, for easy connection to the second grill member 420. It is preferred that the plate 443 has a conical or frusto-conical shape.

Figure 10:
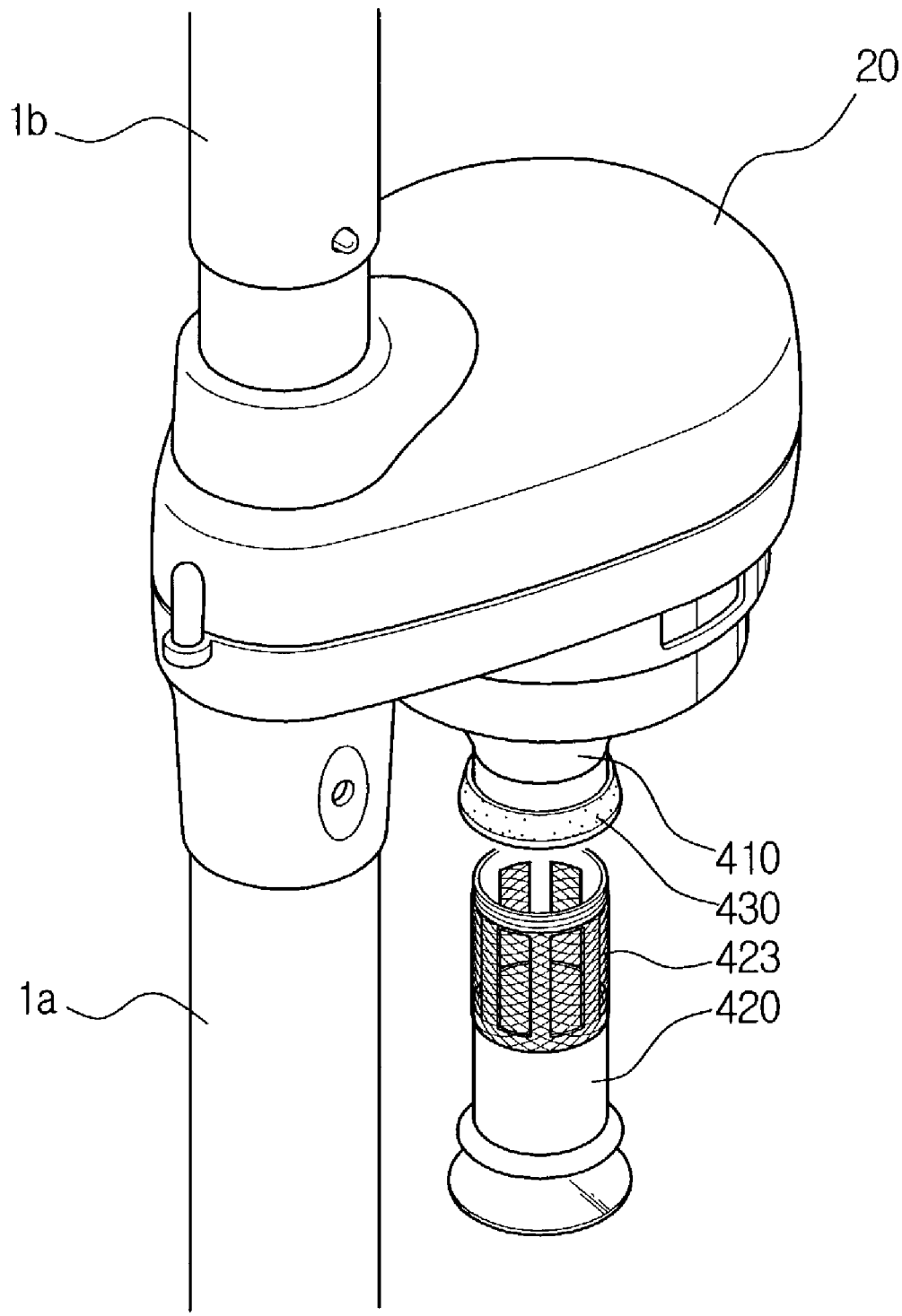
FIG. 10 is a perspective view of a second grill member utilized in a cyclone-type dust-collecting apparatus according to an embodiment of the present invention.

Hereinafter, the operation of the cyclone-type dust-collecting apparatus for the vacuum cleaner according to the present invention will be described with reference to FIGS. 9 and 10.

As shown in FIG. 9, the inflow port 25 of the cyclone-type dust-collecting apparatus is mounted on or connected to the extension pipes 1a, and the outflow port 27 is connected to the extension pipe 1b, as in the case of the conventional cyclone type dust-collecting apparatus. In operation, dust-laden air is drawn in by a suction force generated at the suction port of the cleaner and into the cyclone body 20 in a predetermined oblique direction or angle via the first connection pipe 24 and the air inflow port 25 to initiate and maintain an air vortex inside the cyclone body 20 and the dust-collecting receptacle 30. Accordingly, the dust-laden air descends toward the lower side of the dust-collecting receptacle 30, thereby forming an air vortex. During this process, the dust and dirt are separated from the air by the centrifugal force generated by the air vortex and are collected in the dust-collecting receptacle 30. According to an embodiment of the present invention, when the air vortex is created in the cyclone body 20, the air flow is least disturbed and is retained due to the presence of the guide member 28 (FIG. 5) that is disposed at the sidewall of the air inflow port 25. Therefore, the air vortex is formed and retains its stability with increased directionality, and this allows efficient separation of the dust and dirt while preventing the reverse flow of the dust and dirt into the air vortex.

Next, the air current ascending from the bottom of the dust-collecting receptacle 30 is then driven toward the cleaner body (not shown) of the vacuum cleaner sequentially through the grill portion 423 of the grill assembly 400, the air outflow port 27, and the second connection pipe 26. Some air flow into the grill assembly 400 through the gap between the lower end of the second grill member 420 and the plate 443 of the air reverse flow prevention member 440 and is also discharged toward the cleaner body (not shown) of the vacuum cleaner. At this time, some dust and dirt in the air current ascending upwardly from the bottom of the dirt-collecting receptacle 30 is blocked by the plate 443 and returned to the air vortex. The dust and dirt that are not blocked by the plate 443 are filtered by the grill portion 423 of the grill assembly 400. The dust and dirt larger than the fine passage holes of the grill portion 423 are blocked by the fine passage holes and then returned to the air vortex.

The dust and dirt that were not separated from the air vortex in the dust-collecting receptacle 30 are discharged into the air outflow port 27 via the grill portion 423 of the grill assembly 400, but they are filtered out and collected by a paper filter disposed downstream in the cleaner body (not shown) of the vacuum cleaner. The dirt-free air is finally discharged out of the cleaner body (not shown) via the motor of the vacuum cleaner.

As the above described cleaning operation is performed for an extended period of time, the dust and dirt inevitably collect in the grill portion 423 of the grill assembly 400 such that the fine passage holes of the grill portion 423 are clogged with dust and dirt. Then, a user is required to remove the dust and dirt from the grill portion 423. According to an embodiment of the present invention, the user can easily remove the dust and dirt from the grill portion 423 of the grill assembly 400 by simply separating the second grill member 420 from the cyclone body 20 and then washing the second grill member 420 with water. This provides significant advantages over the conventional cyclone-type dust-collecting apparatus that has to be occasionally separated from the extension pipe in order to remove the dust from the grill assembly. That is, according to the present invention, a user may remove the dirt from the grill assembly 400 by simply separating the second grill member 420 having the grill portion 423 from the cyclone-type dust-collecting apparatus and washing it with water without separating the cyclone-type dust-collecting apparatus from the extension pipes 1a and 1b.

According to the above described embodiment of the present invention as, since the second grill member 420 is separably connected to the first grill member 410 via the connection member 430, a user may easily remove the dirt gathered in the grill portion 423 of the second grill member 420 by simply separating the second grill member 420 from the connection member 430 and washing the second grill member 420 with water. Consequently, removing the dirt from the grill assembly 400 is easier, and as such the vacuum is more convenient to use and requires less repair and maintenance.

Additionally, according to an embodiment of the present invention, due to the guide member 28 (disposed at the sidewall of the air outflow port 25 of the cyclone body 20) that guides the movement of the air vortex, the stability and the directionality of the air vortex is increased. Accordingly, the cleaning efficiency is improved and reverse flow of the dust and dirt is inhibited or prevented. It will be clear that the present invention is well adapted to attain the ends and advantages mentioned as well as others inherent in the concepts of the invention. While a presently preferred embodiment of the present invention been described for purposes of this disclosure, various changes and modifications may be made which are well within the scope of the present invention. Numerous other changes and modifications may be made which will readily suggest themselves to those skilled in the art and which are encompassed in the spirit of the invention as herein disclosed and the invention is only to be limited by the following claims and equivalents thereof.

What is claimed is:

1. A cyclone-type dust-collecting apparatus for a vacuum cleaner, comprising:
   a cyclone body comprising an air inflow port and an air outflow port for forming an air vortex of dust-laden air drawn into the air inflow port;
   a dust-collecting receptacle removably connected to the cyclone body for separating dust and dirt from the air vortex of dust-laden air and for collecting the separated dust and dirt therein; and
   a grill assembly disposed at the air outflow port of the cyclone body for preventing reverse flow of dust and dirt into the air outflow port of the cyclone body, the grill assembly further comprising:
      a conically shaped first grill member having a first end and a second end that is smaller than said first end, said second end of said first grill member having a first connection groove, said first end coupled to the outflow port of the cyclone body;
      a second grill member coupled to the second end of the first grill member, said second grill member having a grill portion that comprises a plurality of fine passage holes to provide fluid communication to the air outflow port and further having a second connection groove formed in an outer surface of the connection end of the second grill member; and
      a connection member having a first connection protrusion shaped to accommodate the first connection groove and having a second connection protrusion shaped to accommodate the second connection groove by which the first grill member and the second grill member are separably connected to each other.

2. The cyclone-type dust-collecting apparatus of claim 1, wherein the connection member is made from a flexible material, and wherein the second connection protrusion has a hemispherical shape are shaped in a semi-circle such that the second grill member is easily connectable to and separable from the connection member.

3. The cyclone-type dust-collecting apparatus of claim 2, wherein the connection member has a first tapered portion formed on an outer surface thereof, the diameter of the first tapered portion gradually increasing in a direction away from the first connection protrusion, the first tapered portion providing for prevention of reverse flow of dirt into the outflow port.

4. The cyclone-type dust-collecting apparatus of claim 3, wherein the first tapered portion has an upper end and a lower end and is formed on an outer surface of the connection member such that the diameter of the first tapered portion gradually increases toward the lower end.

5. The cyclone-type dust-collecting apparatus of claim 2, wherein the connection member has a second tapered portion formed on an inner surface thereof, the diameter of the second tapered portion gradually increasing in the direction away from the second connection protrusion, the second tapered portion providing for guiding the connection of the second grill member to the connection member.

6. The cyclone-type dust-collecting apparatus of claim 5, wherein the second tapered portion of the connection member having an upper end and a lower end is formed on an inner and lower side of the connection member such that the diameter along the upper end and the lower end of the second tapered portion gradually increases toward the lower end.

7. The cyclone-type dust-collecting apparatus of claim 1, wherein the second grill member includes an open part having a plurality of radially extending passage holes formed adjacent an upper side thereof and a closed part formed adjacent a lower side thereof, and further comprising a net attachable to the open part of the second grill member.

8. The cyclone-type dust-collecting apparatus of claim 1, wherein the grill assembly further comprises an air reverse flow prevention member connected to the second grill member for blocking the dust in the air current from ascending upwardly from the bottom of the dust-collecting receptacle.

9. The cyclone-type dust-collecting apparatus of claim 8, wherein the air reverse flow prevention member further comprises:
   a cylinder body having upper and lower supporters, each of which comprises at least two ribs, the cylinder body being inserted by interference fit into a lower side of the second grill member;
   a shaft supported by the upper and lower supporters; and
   a plate connected to an end of the shaft and separated from a lower end of the second grill member.

10. The cyclone-type dust-collecting apparatus of claim 9, wherein the cylinder body has a spiral guide formed therein for guiding movement of the air current.

11. The cyclone-type dust-collecting apparatus of claim 9, wherein the cylinder body and the plate are made of rubber.

12. The cyclone-type dust-collecting apparatus of claim 9, wherein the plate is conically shaped.

13. The cyclone-type dust-collecting apparatus of claim 1, wherein the cyclone body has a guide member disposed at a sidewall of the air inflow port of the cyclone body, including a guide surface having a predetermined radius of curvature, for guiding movement of air drawn into the air inflow port to and for increasing the stability and directionality of the air vortex.

14. The cyclone-type dust-collecting apparatus of claim 13, wherein the radius of curvature of the guide surface is smaller than the radius of that portion of the cyclone body in which the air vortex is maintained.

* * * * *